United States Patent
Moniz et al.

(10) Patent No.: US 10,358,942 B2
(45) Date of Patent: Jul. 23, 2019

(54) CORE DIFFERENTIAL BEARING WITH CENTERING SPRING AND SQUEEZE FILM DAMPER

(71) Applicant: General Electric Company, Schenectady, NY (US)

(72) Inventors: Thomas Ory Moniz, Loveland, OH (US); Joseph George Rose, Mason, OH (US)

(73) Assignee: General Electric Company, Schenectady, NY (US)

(*) Notice: Subject to any disclaimer, the term of this patent is extended or adjusted under 35 U.S.C. 154(b) by 387 days.

(21) Appl. No.: 15/052,939

(22) Filed: Feb. 25, 2016

(65) Prior Publication Data
US 2017/0248033 A1    Aug. 31, 2017

(51) Int. Cl.
| F01D 25/16 | (2006.01) |
| F02C 3/067 | (2006.01) |
| F16C 27/04 | (2006.01) |
| F01D 25/18 | (2006.01) |
| F16C 19/26 | (2006.01) |

(52) U.S. Cl.
CPC ........... *F01D 25/164* (2013.01); *F01D 25/18* (2013.01); *F02C 3/067* (2013.01); *F16C 27/045* (2013.01); *F05D 2220/32* (2013.01); *F05D 2240/50* (2013.01); *F05D 2240/60* (2013.01); *F05D 2250/44* (2013.01); *F05D 2260/96* (2013.01); *F05D 2260/98* (2013.01); *F16C 19/26* (2013.01); *F16C 2360/23* (2013.01); *Y02T 50/671* (2013.01)

(58) Field of Classification Search
CPC ........ F01D 25/164; F01D 25/18; F02C 3/067; F16C 19/26; F16C 27/045; F16C 2360/23; F05D 2220/32; F05D 2240/50; F05D 2240/60; F05D 2250/44; F05D 2260/96; F05D 2260/23; F05D 2260/98; Y02T 50/671

See application file for complete search history.

(56) References Cited

U.S. PATENT DOCUMENTS

| 4,046,430 A | 9/1977 | Buono et al. |
| 4,214,796 A | 7/1980 | Monzel et al. |
| 4,693,616 A * | 9/1987 | Rohra .................. F01D 25/164 384/99 |
| 4,781,077 A | 11/1988 | El-Sahfei |

(Continued)

FOREIGN PATENT DOCUMENTS

GB    1 587 285 A    4/1981

OTHER PUBLICATIONS

Extended European Search Report and Opinion issued in connection with corresponding EP Application No. 17157007.0 dated Sep. 4, 2017.

*Primary Examiner* — Igor Kershteyn
(74) *Attorney, Agent, or Firm* — Dority & Manning, P.A.

(57) ABSTRACT

A counter-rotating shaft assembly of a gas turbine engine includes an outer shaft rotatable in a first direction about a virtual rotational axis, an inner shaft counter-rotatable about the virtual rotational axis in a second direction that is opposite to the first direction, a differential bearing rotatably connecting the two shafts, a centering spring connecting the inner shaft to the differential bearing, and a squeeze film damper between the differential bearing and the inner shaft.

20 Claims, 5 Drawing Sheets

(56) References Cited

U.S. PATENT DOCUMENTS

| | | | |
|---|---|---|---|
| 5,088,840 A * | 2/1992 | Radtke | F01D 25/164 384/535 |
| 5,110,257 A * | 5/1992 | Hibner | F01D 25/164 415/119 |
| 5,344,239 A | 9/1994 | Stallone et al. | |
| 6,135,639 A * | 10/2000 | Dede | F16C 27/045 384/581 |
| 6,679,045 B2 * | 1/2004 | Karafillis | F01D 25/16 184/6.11 |
| 6,935,837 B2 | 8/2005 | Moniz et al. | |
| 7,353,647 B2 | 4/2008 | Orlando et al. | |
| 7,513,102 B2 | 4/2009 | Moniz et al. | |
| 7,574,854 B2 | 8/2009 | Moniz | |
| 7,594,388 B2 | 9/2009 | Cherry et al. | |
| 7,857,519 B2 * | 12/2010 | Kostka | F01D 25/164 384/535 |
| 8,083,413 B2 * | 12/2011 | Ertas | F16C 17/035 384/117 |
| 8,092,093 B2 | 1/2012 | Fang et al. | |
| 8,182,153 B2 * | 5/2012 | Singh | F01D 25/164 384/477 |
| 8,308,426 B2 | 11/2012 | Cigal et al. | |
| 8,747,054 B2 | 6/2014 | Witlicki | |
| 2002/0067871 A1 * | 6/2002 | Bos | F16C 27/045 384/99 |
| 2006/0097589 A1 | 5/2006 | Gerez et al. | |
| 2008/0152483 A1 * | 6/2008 | Godleski | F01D 25/164 415/142 |
| 2013/0108440 A1 | 5/2013 | Do et al. | |
| 2014/0126992 A1 | 5/2014 | Morreale et al. | |
| 2014/0255148 A1 | 9/2014 | Burns et al. | |

\* cited by examiner

CORE DIFFERENTIAL BEARING WITH CENTERING SPRING AND SQUEEZE FILM DAMPER

FIELD OF THE INVENTION

The present subject matter relates generally to a cylindrical roller bearing, or more particularly to a cylindrical roller bearing for the high pressure spool in a gas turbine engine.

BACKGROUND OF THE INVENTION

A gas turbine engine generally includes a fan and a core arranged in flow communication with one another with the core disposed downstream of the fan in the direction of the flow through the gas turbine. The core of the gas turbine engine generally includes, in serial flow order, a compressor section, a combustion section, a turbine section, and an exhaust section. With multi-shaft gas turbine engines, the compressor section can include a high pressure compressor (HP compressor) disposed downstream of a low pressure compressor (LP compressor), and the turbine section can similarly include a low pressure turbine (LP turbine) disposed downstream of a high pressure turbine (HP turbine). With such a configuration, the HP compressor is coupled with the HP turbine via a high pressure shaft (HP shaft), and the LP compressor is coupled with the LP turbine via a low pressure shaft (LP shaft).

In operation, at least a portion of air over the fan is provided to an inlet of the core. Such portion of the air is progressively compressed by the LP compressor and then by the HP compressor until the compressed air reaches the combustion section. Fuel is mixed with the compressed air and burned within the combustion section to provide combustion gases. The combustion gases are routed from the combustion section through the HP turbine and then through the LP turbine. The flow of combustion gasses through the turbine section drives the HP turbine and the LP turbine, each of which in turn drives a respective one of the HP compressor and the LP compressor via the HP shaft and the LP shaft. The combustion gases are then routed through the exhaust section, e.g., to atmosphere.

To maximize fuel burn in a high performance turbine engine, it is desirable to have a fan with a high bypass ratio combined with a small core. To reduce engine cost, engine weight and engine complexity, it is desirable to use differential bearings to support the high pressure shaft from the counter-rotating low pressure shaft. However, because the lengths of the cores of modern engines are tending to become longer and longer and the counter-rotating shafts are tending to rotate faster and faster, this type of configuration results in unacceptably high loads on the differential bearing that otherwise might desirably be used to support the high pressure shaft from the counter-rotating low pressure shaft. In order to support these otherwise unacceptably high loads requires the addition of frame structure, which adds weight, cost and complexity to the overall design, and thus is undesirable.

Various dynamic issues invariably will arise during the extended operation of the differential bearing. Accordingly, the ability of the differential bearing to tolerate and mitigate these dynamic issues can improve its capacity, life and reliability and thereby lower the frequency of the engine maintenance. Additionally, providing proper lubrication and cooling to the differential bearing that supports the counter-rotating shafts is necessary to maximize the life of the differential bearing and the load capacity of the differential bearing. Thus, any improvement in the tolerance of the differential bearing to deal with anticipated dynamic issues must not adversely affect proper lubrication and cooling to the differential bearing.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, a counter-rotating shaft assembly of a gas turbine engine includes a differential bearing that couples counter-rotating concentric shafts. A cylindrical inner shaft has a smaller diameter and fits within a cylindrical outer shaft. Both the inner shaft and the outer shaft rotate about the same virtual central axis but rotate in opposite directions. The differential bearing has an inner race coupled to the inner shaft (e.g., low pressure spool) and an outer race coupled to the outer shaft (e.g., high pressure spool). A squeeze film damper is disposed between the inner race of the differential bearing and the inner shaft, which is connected to the inner race by a spring finger housing.

Each of the above exemplary embodiments of the present disclosure adds damping to the system in a very compact and efficient manner by incorporating the squeeze film damper directly into the inner shaft. Each of these embodiments maximizes the bearing's dynamic tolerance capability to maximize the bearing's load capacity, reliability and useful life without compromising the effectiveness of the lubrication and cooling of the differential bearing. Thus, each embodiment improves the engine's time in active service.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF ILLUSTRATIVE EMBODIMENTS

Figure 1:
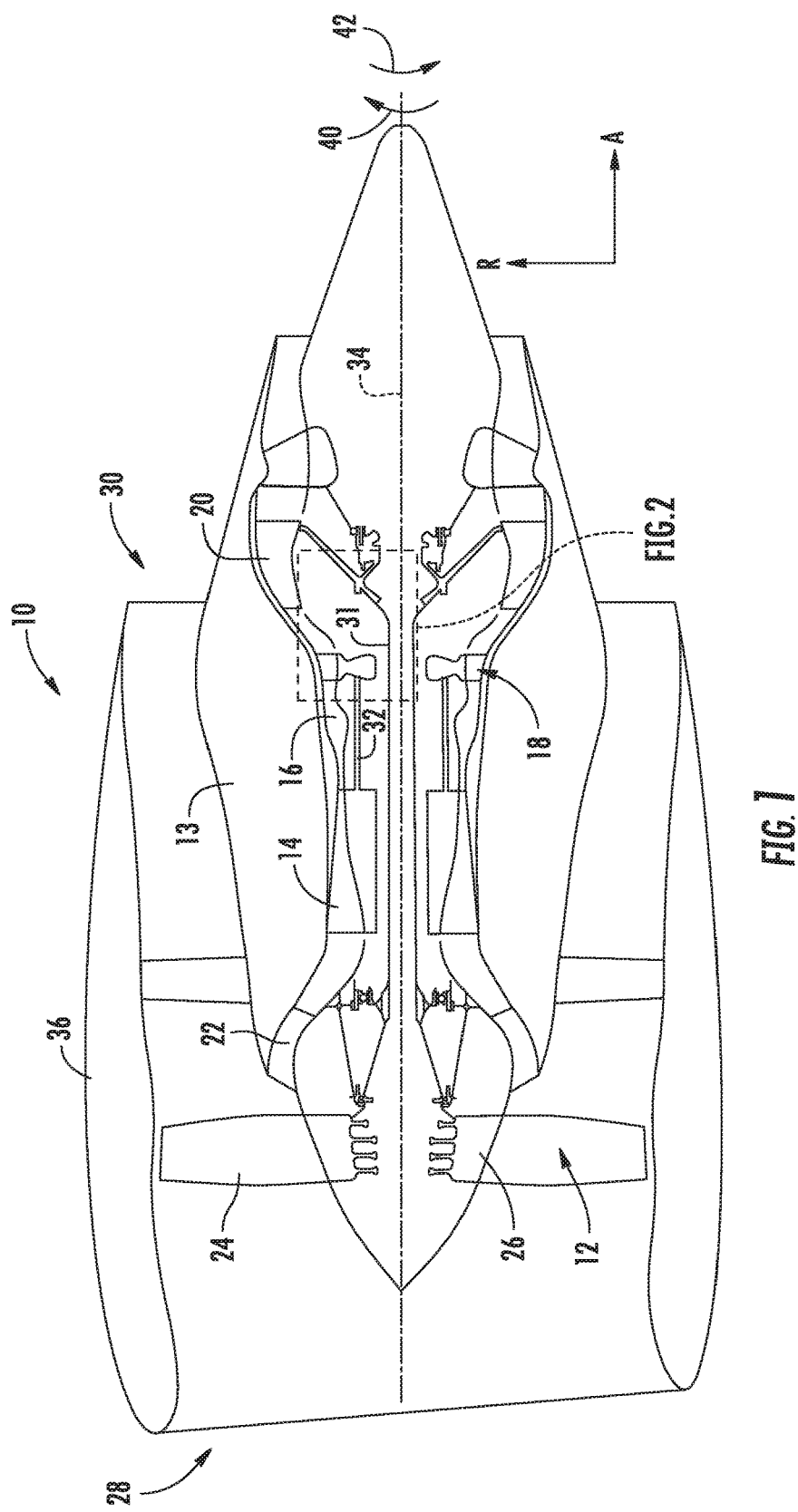
FIG. 1 is a schematic cross-sectional view of an exemplary gas turbine engine according to various embodiments of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or relative importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the fluid can be a gas such as air or a liquid such as a lubricant.

Referring now to the drawings, wherein identical numerals indicate the same elements throughout the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." An example would be a GEnx model turbofan engine available from General Electric Company, Cincinnati, Ohio.

As schematically shown in FIG. 1, the turbofan engine 10 defines an axial direction A (extending parallel to a longitudinal centerline 34 provided for reference) and a radial direction R that is normal to the axial direction A. In general, the turbofan 10 includes a fan section 12 and a high pressure (HP) compressor 14 disposed downstream from the fan section 12 and a combustor 16 located downstream from the HP compressor 14. A high pressure (HP) turbine 18 is located downstream from the combustor 16, and a low pressure (LP) turbine 20 is located downstream from the high pressure turbine 18. A low pressure (LP) compressor 22 is disposed upstream of the high pressure compressor 14. An array of fan blades 24 extend radially outward from a rotor disk 26 that forms part of the fan assembly 12 that is disposed upstream of the LP compressor 22 and the HP compressor 14.

The high pressure compressor 14 and the high pressure turbine 18 are coupled by a high pressure (HP) shaft or spool 32 that drivingly connects the HP turbine 18 to the HP compressor 14 to rotate them in unison. The low pressure (LP) shaft or spool 31 drivingly connects the LP turbine 20 to the LP compressor 22 to rotate them in unison. The LP shaft 31 may be drivingly connected to the fan assembly 12 via an epicyclic gearing arrangement housed in a power gearbox that is not separately illustrated in FIG. 1 as this gearing arrangement is not germane to the present invention.

As schematically shown in FIG. 1, the LP shaft 31 and the HP shaft 32 are counter-rotating. One of the shafts 31, 32 rotates about the longitudinal centerline 34 in the clockwise direction that is schematically represented by the arrow designated 40, while the other shaft 31 or 32 counter rotates about the longitudinal centerline 34 in the counter-clockwise direction that is schematically represented by the arrow designated 42.

The compressor sections 22, 14, the combustion section 16, and the turbine sections 18, 20 together define a core air flowpath. Additionally, the exemplary fan section 12 includes an annular fan casing or outer nacelle 36 that circumferentially surrounds the fan blades 24 and/or at least a portion of the core of the turbine engine 10. It should be appreciated that the nacelle 36 may be configured to be supported relative to the core of the turbine engine 10 by a plurality of circumferentially-spaced outlet guide vanes. Alternatively, the nacelle 36 also may be supported by struts of a structural fan frame. A substantially tubular outer casing of the nacelle 36 defines an annular inlet 28 and an annular exhaust 30 that is located downstream from the inlet 28. Moreover, a downstream section of the nacelle 36 may extend over an outer portion of the core of the turbine engine 10 so as to define a bypass airflow groove therebetween.

During operation of the turbofan engine 10, a volume of air enters the turbofan 10 through an associated inlet 28 of the nacelle 36 and into the fan section 12. As the volume of air passes across the fan blades 24, a first portion of the air is directed or routed into the bypass airflow groove, and a second portion of the air is directed or routed into the upstream section of the core air flowpath, or more specifically into the inlet of the LP compressor 22. The ratio between the first portion of air and the second portion of air is commonly known as a bypass ratio. The pressure of the second portion of air is then increased as it is routed through the high pressure (HP) compressor 14 and into the combustion section 16, where the highly pressurized air is mixed with fuel and burned to provide combustion gases.

The combustion gases are routed into and expand through the HP turbine 18 where a portion of thermal and/or kinetic energy from the combustion gases is extracted via sequential stages of HP turbine stator vanes that are coupled to the outer casing 36 and HP turbine rotor blades that are coupled to the HP shaft or spool 32, thus causing the HP shaft or spool 32 to rotate, thereby supporting operation of the HP compressor 14. The combustion gases are then routed into and expand through the LP turbine 20 where a second portion of thermal and kinetic energy is extracted from the combustion gases via sequential stages of LP turbine stator vanes that are coupled to the outer casing 36 and LP turbine rotor blades that are coupled to the LP shaft or spool 31, thus causing the LP shaft or spool 31 to rotate, thereby supporting operation of the LP compressor 22 and rotation of the fan blades 24 via the LP shaft 31 or, alternatively, through a power gearbox.

The combustion gases are subsequently routed through the jet exhaust nozzle section of the core of the turbine engine 10 to provide propulsive thrust. Simultaneously, the pressure of the first portion of air is substantially increased as the first portion of air is routed through the bypass airflow groove before it is exhausted from a fan nozzle exhaust section of the turbofan 10, also providing propulsive thrust. The HP turbine 18, the LP turbine 20, and the jet exhaust nozzle section at least partially define a hot gas path for routing the combustion gases through the core of the turbine engine 10.

It should be appreciated, however, that the exemplary turbofan engine 10 depicted in FIG. 1 is by way of example only, and that in other exemplary embodiments, the turbofan engine 10 may have another suitable configuration. For example, in other exemplary embodiments, the fan assembly 12 may be configured in another suitable manner (e.g., as a fixed pitch fan) and further may be supported using any other suitable fan frame configuration. Moreover, it also should be appreciated that in other exemplary embodiments, another suitable LP compressor 22 configuration may be utilized. It also should be appreciated, that in still other exemplary embodiments, aspects of the present disclosure may be incorporated into another suitable gas turbine engine. For example, in other exemplary embodiments, aspects of the present disclosure may be incorporated into, e.g., a turboshaft engine, turboprop engine, turbocore engine, turbojet engine, etc.

Figure 2:
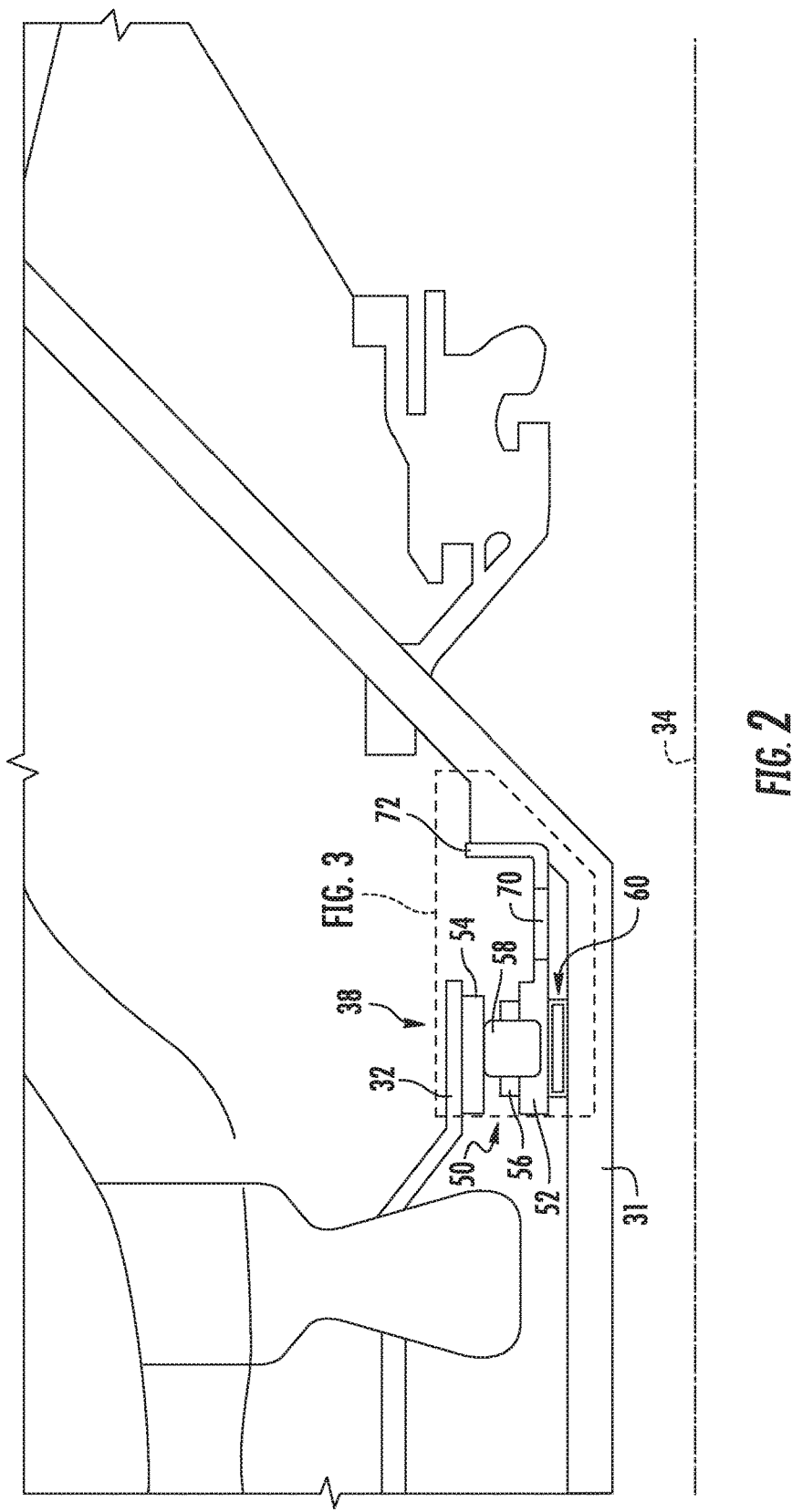
FIG. 2 is a schematic view partially in cross-section of components of a differential bearing assembly between the counter-rotating high pressure shaft and low pressure shaft of the exemplary gas turbine engine of FIG. 1.

As schematically shown in FIG. 2, a counter-rotating shaft assembly 38 of a gas turbine engine desirably includes an outer shaft 32, and inner shaft 31, a differential bearing 50, a squeeze film damper 60 and a centering spring 70. As schematically indicated in FIG. 1 by the arrow 40, a cylindrical outer shaft 32 is rotatable in a first direction (clockwise) about a virtual rotational axis 34. While as schematically indicated in FIG. 1 by the arrow 42, a cylindrical inner shaft 31 is counter-rotatable about the virtual rotational axis 34 in a second direction (counterclockwise) that is opposite to the first direction. The inner shaft 31 is disposed radially inwardly with respect to the outer shaft 32. The differential bearing 50 rotatably couples the inner shaft 31 to the outer shaft 32. In the embodiments depicted in FIGS. 1-5, the high pressure shaft forms the outer shaft 32 and the low pressure shaft forms the inner shaft 31 that are supported by the counter-rotating differential bearing 50. The squeeze film damper 60 is disposed between the inner shaft 31 and the differential bearing 50. Additionally, as schematically shown in FIG. 2, the differential bearing 50 is attached to the inner shaft 31 via the centering spring 70.

Figure 5:
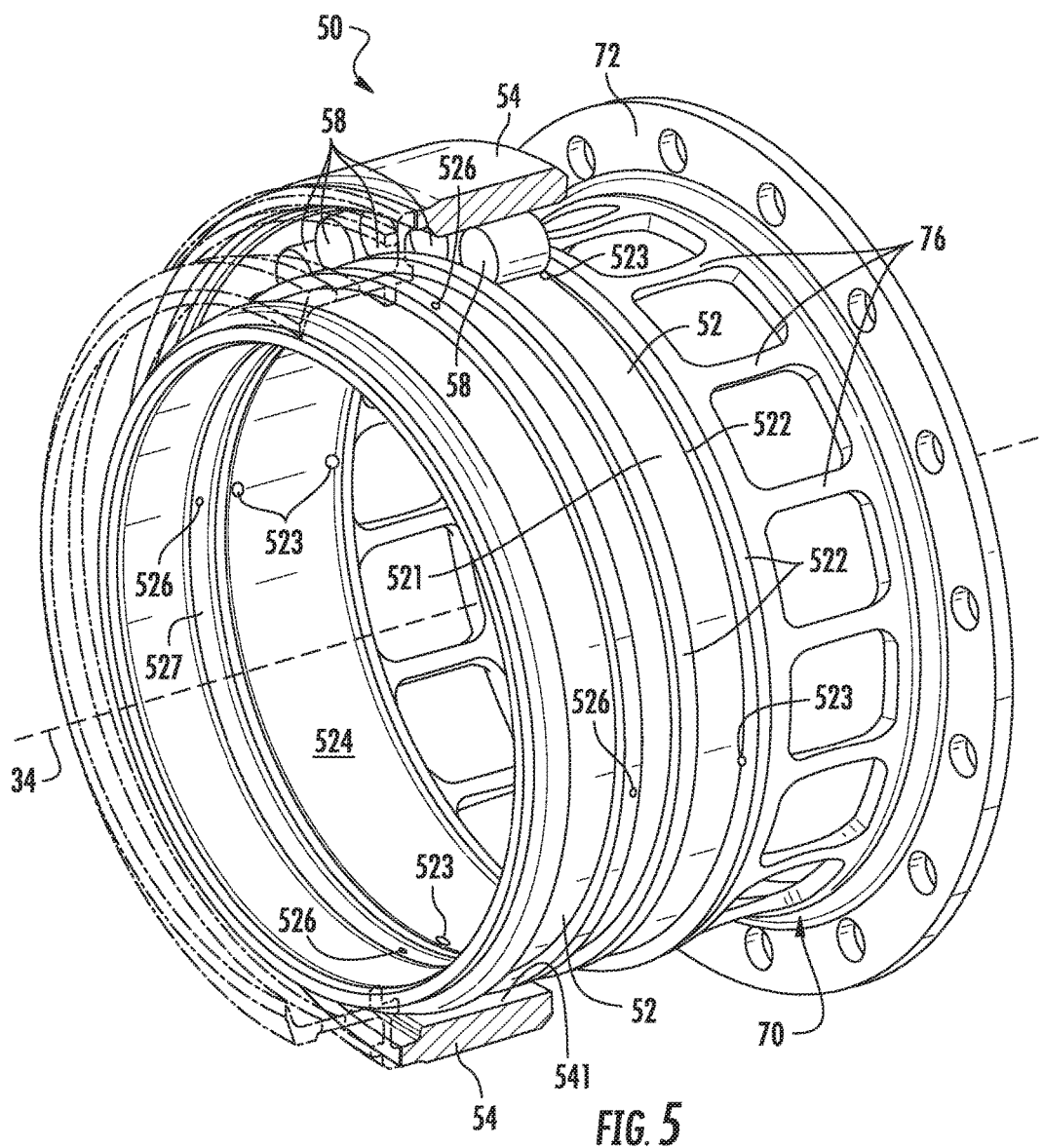
FIG. 5 is a perspective view of embodiments of some of the components within the dashed rectangle designated FIG. 3 in FIG. 2 with portions of some of the components partially cut away and other portions shown in chain dashed lines to facilitate explanation of the structure and operation of the present invention.

As schematically shown in FIG. 2 for example, the differential bearing 50 includes an inner race 52, an outer race 54 and a roller cage 56. The inner race 52 of the differential bearing 50 is attached to the inner shaft 31 by the centering spring 70. The outer race 54 is non-rotatably attached to the outer shaft 32 and rotatable with respect to the inner race 52. As schematically shown in FIG. 5 for example, a plurality of cylindrical rollers 58 is disposed between and the inner race 52 and the outer race 54, and each individual cylindrical roller 58 rotatably contacts both the inner race 52 and the outer race 54.

Figure 4:
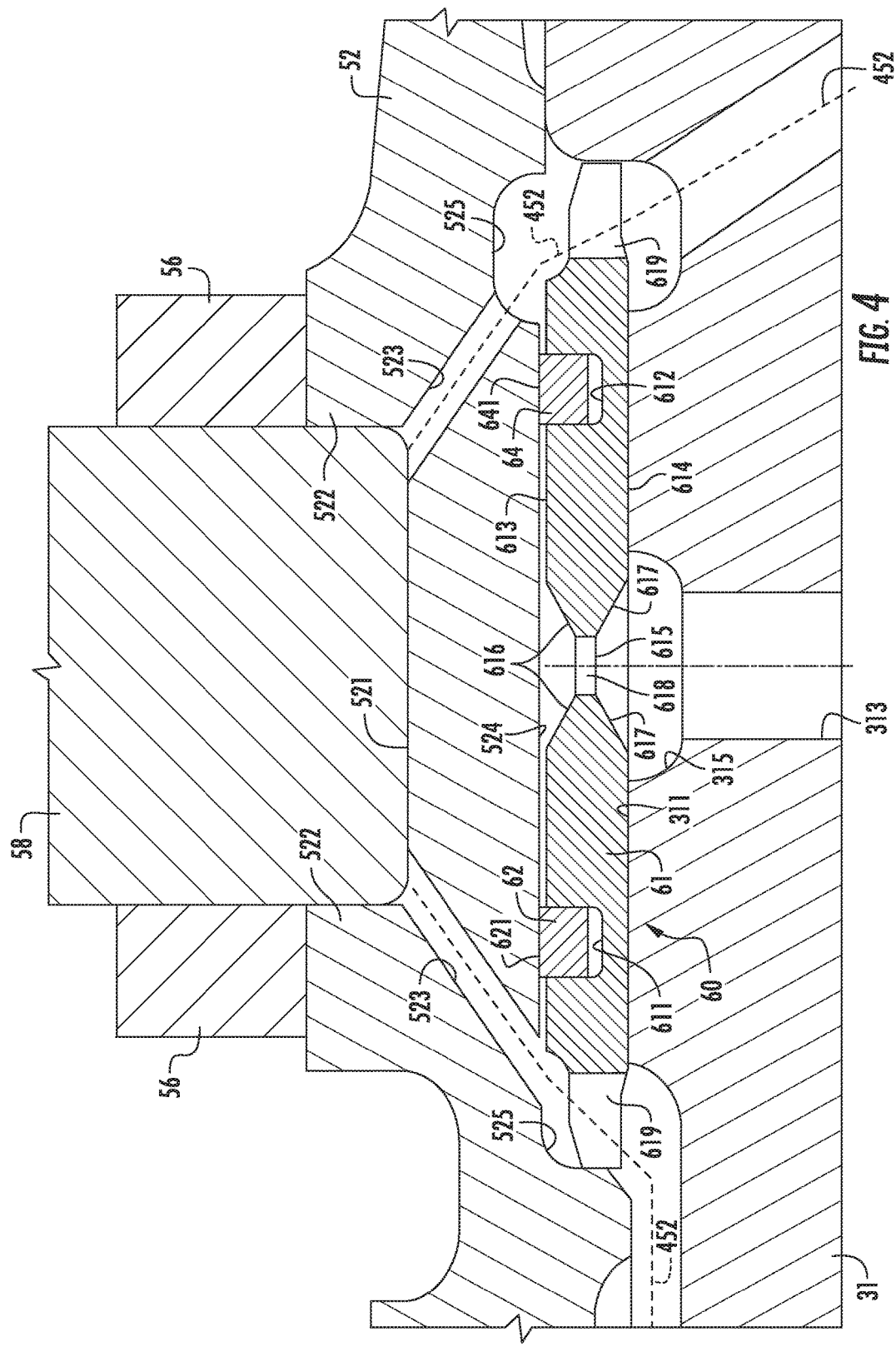
FIG. 4 is an enlarged schematic cross-sectional view of portions of some of the components taken within the dashed rectangle designated FIG. 4 in FIG. 3.

As schematically shown in FIG. 4 for example, a raceway is formed by the portion of the outer surface 521 of the inner race 52 that is configured to receive and rotatably guide therein the cylindrical rollers 58, which are free to rotate relative to both the raceway and the outer race 54 of the differential bearing 50. As shown in FIGS. 4 and 5 for example, the raceway portion of the outer surface 521 of the inner race 52 defines an annular surface that extends in both a circumferential direction and an axial direction and is bordered at each axial end thereof by a side rail 522. The raceway of the inner race 52 receives rollers 58 and contacts a portion of each of the cylindrical outer surfaces of the cylindrical rollers 58 disposed in the differential bearing 50. As schematically shown in FIGS. 4 and 5 for example, disposed opposite to the raceway 521, the inner race 52 defines a cylindrical inner surface 524. Though the inner shaft 31 is not depicted in FIG. 5, the generally cylindrically shaped inner shaft 31 passes through the hollow generally cylindrical interior space confined within the cylindrical inner surface 524 of the inner race 52 of the differential bearing 50.

In the exemplary single track embodiment of the differential bearing 50 illustrated in the FIGS., a roller cage 56 desirably is disposed between the inner race 52 and the outer race 54. The roller cage 56 is free to rotate with respect to both the inner race 52 and the outer race 54, but at a different speed than the speed of rotation of the outer race 54. The roller cage 56 is configured to maintain between each respective cylindrical roller 58 deployed in the raceway of the inner race 52, a respective separation in the circumferential direction. Thus, the roller cage 56 defines its own circumferential row of generally rectangular openings disposed above the raceway of the inner race 52.

As shown in FIG. 4 for example, each generally rectangular opening of the roller cage 56 is bounded by a pair of opposing, parallel and spaced apart guiderails (which are shown in cross-section in FIG. 4) that elongate in the circumferential direction. Though not visible in the view depicted in FIG. 4 for example, the roller cage 56 includes respective wall elements that are disposed to extend axially between the opposing guiderails of the roller cage 56. All of the wall elements are identically configured and dimensioned, and adjacent wall elements are spaced apart circumferentially to define the two axially extending edges of a generally rectangular opening that receives a respective roller 58. Accordingly, the roller cage 56 defines a plurality of these openings that in turn receive the plurality of rollers 58 that are included in the differential bearing 50.

Because the differential bearing 50 desirably is inner-race-guided, as shown in FIG. 4 for example, each respective guiderail of the roller cage 56 is disposed above a respective side rail 522 of the inner race 52 with a close clearance between the two respective opposing surfaces of the side rail 522 and the guiderail. This close clearance desirably is on the order of 0.005 to 0.050 inches inclusive. Each of the plurality of cylindrical rollers 58 is partially confined and guided on the cylindrical raceway 521 by the side rails 522 and partially by the guiderails of the roller cage 56. The roller cage 56 desirably rides on a thin film of lubricating oil that is maintained between the cylindrical interior surfaces of the roller cage 56 and the opposing cylindrical exterior surfaces of the side rails 522 of the inner race 52.

For the embodiment depicted, the differential roller bearing 50 may be formed of any suitable material. For example, in at least certain exemplary embodiments, the differential roller bearing 50 may be formed of a suitable metal material, such as a chrome steel or a high carbon chrome steel. Alternatively, in other exemplary embodiments, the differential roller bearing 50 may include one or more components formed of a suitable ceramic material. The cylindrical rollers 58 can comprise a ceramic material of a known composition, for example silicon nitride ($Si_3Ni_4$).

Figure 3:
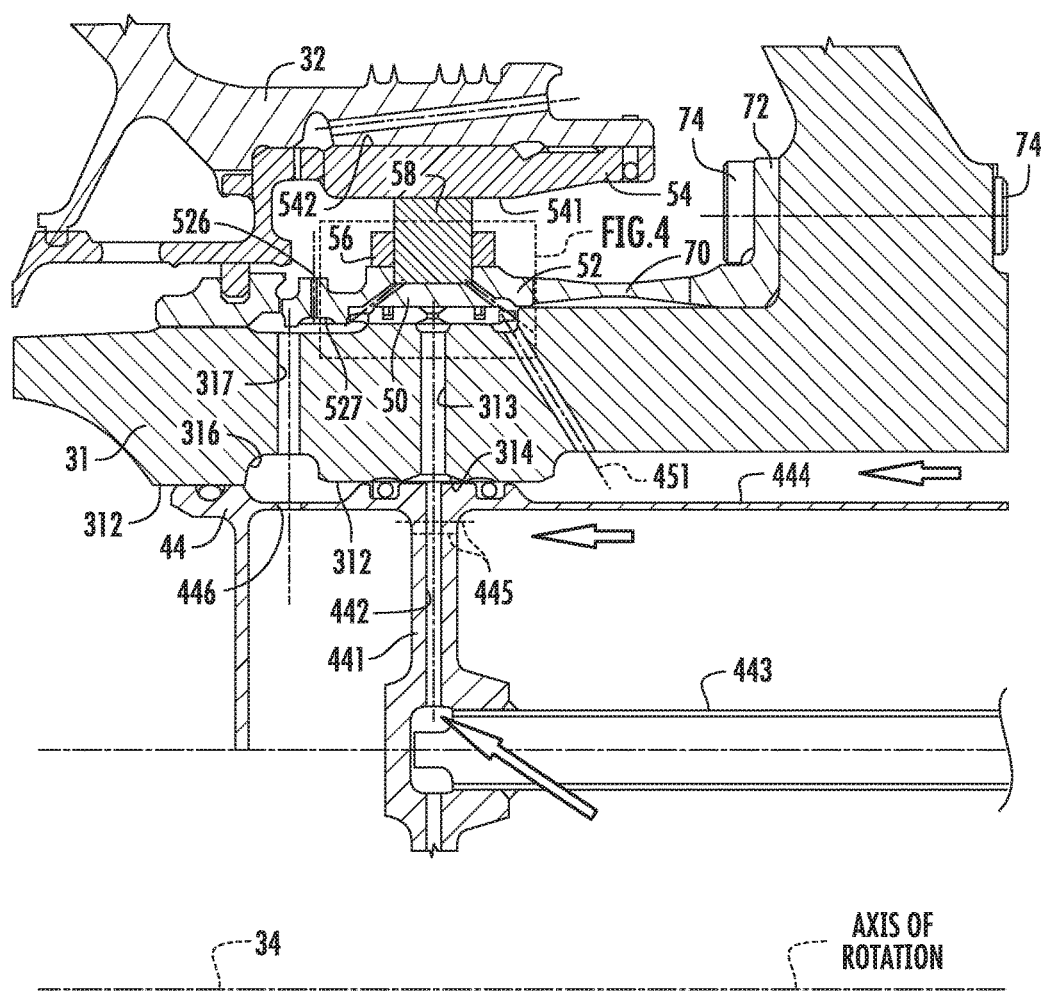
FIG. 3 is an enlarged schematic cross-sectional view of portions of some of the components taken within the dashed rectangle designated FIG. 3 in FIG. 2.

As shown in FIG. 3 for example, the cylindrical exterior surface 542 of the outer race 54 of the differential bearing 50 is non-rotatably connected to the outer shaft 32 of the engine 10. As shown in FIG. 3 for example, each of the plurality of cylindrical rollers 58 is disposed to contact the cylindrical interior surface 541 of the outer race 54 of the differential bearing 50. As shown in FIGS. 3 and 4 for example, the outer race 54 of the differential bearing 50 desirably is a single-piece component that defines the cylindrical interior surface 541 that rotatably contacts and retains the rollers 58 of the differential bearing 50.

As shown in FIGS. 2, 3 and 5 for example, the inner race 52 desirably is connected to the inner shaft 31 via a centering spring 70. The forward end of the centering spring 70 is connected to the aft end of the inner race 52, while the aft end of the centering spring 70 is attached to the inner shaft 31 via a flange 72. As schematically shown in FIG. 3 for example, the aft end of the centering spring 70 desirably can be mechanically attached to the inner shaft 31 via a plurality of threaded bolts 74. As shown in FIGS. 3 and 5 for example, the inner race 52, centering spring 70 and flange 72 are formed as a unitary structure. The centering spring 70 provides radial damping by attenuating the range of the radial play that is permitted between the differential bearing 50 and the inner shaft 31.

The centering spring 70 can include a plurality of axially extending spring fingers 76 forming a spring finger housing. Each finger 76 defines a forward end and an aft end disposed axially spaced apart from and opposite to the forward end of each respective finger 76. Each respective finger 76 undergoes a tapering from each opposite end of each respective finger 76 to a certain degree until the narrowed dimension of that respective finger 76 is attained. Each opposite circumferential side and top and bottom surface of each finger 76 can be machined to attain the desired tapering. Thus, each of the fingers 76 includes an intermediate portion that extends axially between each respective front end and respective aft end of each respective finger 76. Each of these intermediate portions is narrower than each respective front end and respective aft end of each respective finger 76. The specific relative dimensions of the intermediate portions with respect to the front ends and aft ends will depend upon the dimensions and composition of the inner race 52 as well as the anticipated level of stress for which the differential bearing 50 is being engineered.

As schematically shown in FIG. 4, an annular recess is defined around the portion of the outer surface 311 of the inner shaft 31 where the differential bearing 50 is to be disposed. As schematically shown in FIG. 4, the squeeze film damper 60 (FIG. 3) desirably includes an annular ring 61 that defined by an outer surface 613 and an inner surface 614 that is opposite to and concentric with the outer surface 613. The diameter of the inner surface 614 of the annular ring 61 is smaller than the diameter of the outer surface 613 of the annular ring 61 by the radial thickness of the annular ring 61. The annular ring 61 is non-rotatably connected to the inner shaft 31. Desirably, this non-rotatable connection is effected by having the annular ring 61 pressfit into the annular recess that is formed in the outer surface 311 of the inner shaft 31.

As schematically shown in FIG. 4, intermediate the forward edge of the annular ring 61 and the center of the annular ring 61, there is a forward groove 611 that extends circumferentially around the virtual central axis 34 (FIG. 3) and forms part of the forward end of the squeeze film damper 60 that is disposed between the outer surface 311 of the inner shaft 31 and the inner surface 524 of the inner race 52. Similarly, intermediate the aft edge of the annular ring 61 and the center of the annular ring 61, there is defined an aft groove 612 that extends circumferentially around the virtual central axis 34 (FIG. 3) and forms part of the aft end of the squeeze film damper 60 that is disposed between the outer surface 311 of the inner shaft 31 and the inner surface 524 of the inner race 52. As shown in FIG. 4, each of the forward groove 611 and the aft groove 612 defines a radial depth that extends from the outer surface 613 of the annular ring 61 in a direction radially toward the inner surface 614 of the annular ring 61 of the squeeze film damper 60, but terminates before reaching the inner surface 614 of the annular ring 61. Thus, the depth of each of the forward groove 611 and the aft groove 612 has a diameter that is larger than the diameter of the inner surface 614 of the annular ring 61 but smaller than the diameter of the outer surface 613 of the annular ring 61.

As shown in FIG. 4, the squeeze film damper 60 further includes a forward resilient seal 62 disposed within the forward groove 611 and an aft resilient seal 64 disposed within the aft groove 612. Each of the forward seal 62 and the aft seal 64 is provided to seal the outer surface 613 of the annular ring 61 to the inner surface 524 of the inner race 52 of the differential bearing 50. Each resilient seal 62, 64 desirably is a solid tubular element having a rectangular cross-section formed into a continuous ring seal in its uncompressed state. Each resilient seal 62, 64 is defined by a cylindrical inner surface defined by an inner diameter. Each resilient seal 62, 64 is defined by a cylindrical outer surface that is concentric with the cylindrical inner surface and defined by an outer diameter that is larger than the inner diameter of the inner surface. Each resilient seal 62, 64 has forward surface that is flat and an aft surface that is flat and parallel to the forward surface. Each of the forward and aft surfaces of each resilient seal 62, 64 defines an annular shape. A split piston ring with a lap joint and having a solid rectangular cross-section provides a desirable resilient seal 62, 64.

As schematically shown in FIG. 4, the uncompressed diameter of the outer cylindrical surface 621,641 of each respective resilient seal 62, 64 is greater than the diameter of the outer surface 613 of the annular ring 61 in which each respective groove 611, 612 is defined. In this way, when the respective resilient seals 62, 64 are in their uncompressed states, the squeeze film damper 60 provides an annular gap that is disposed between the outer surface 613 of the annular ring 61 and the inner surface 524 of the inner race 52. The resilient seals 62, 64 resiliently bear against the inner race 52 and seal off the forward and aft ends of the annular gap, and also apply to the differential bearing 50 a radial centering force that urges the inner race 52 into a position coaxial with the inner shaft 31. However, the depth of each of the forward groove 611 and the aft groove 612 has a diameter that is smaller than the diameter of the respective cylindrical inner surface of each of the respective resilient seals 62, 64. In this way, space is provided within each of the respective forward groove 611 and aft groove 612 so that the respective resilient seals 62, 64 can be compressed in the radial direction to narrow the annular gap in the radial direction between the outer surface 613 of the annular ring and the inner surface 524 of the inner race.

Any material with appropriate stiffness and fatigue life may be used to construct the resilient seals 62, 64. The geometry of the resilient seal 62, 64 cross section, such as the wall thickness defined between the flat forward and aft surfaces, diameter, etc., may be selected to provide desired stiffness characteristics for the resilient seals 62, 64, for example the spring constant "K" in the radial direction. The functional characteristics of the resilient seals 62, 64 may be further tuned and optimized by combining a spring (not shown) in series with each of the resilient seals 62, 64.

The cross-sectional view depicted in FIG. 3 is an enlarged view that shows additional detail than is depicted in FIG. 2. For example, the inner shaft 31 is provided with a cover 44 that is non-rotatably attached to the inner surface 312 of the inner shaft 31 to define between the cover 44 and the inner surface 312 of the inner shaft 31 a first low pressure plenum. This cover 44 also desirably carries internally thereof a second low pressure plenum. Each of the first and second low pressure plenums extends in the axial direction. Each aft end of each of the low pressure plenums is connected to a supply of lubricating oil that provides lubrication and cooling to the differential bearing 50. As is conventional, this lubricating oil is maintained at a much lower pressure than the incompressible fluid supplied to the high pressure plenum.

As schematically shown in FIG. 3, an axially extending high pressure conduit 443 is disposed internally of the cover 44. The aft end of the high pressure conduit 443 is connected in fluid communication with a high pressure supply of incompressible fluid that provides the high pressure fluid film for the squeeze film damper 60. The source of incompressible fluid is maintained by any conventional means at a pressure high enough to serve as the high pressure incompressible fluid supply for the thin film of the squeeze film damper 60. The cover 44 defines a radially extending web 441 in which a plurality of radially extending hollow bores 442 are defined. A cross-section of one of these radial bores 442 is visible in the view shown in FIG. 3. The forward end of the high pressure conduit 443 is connected in fluid communication with the respective inner end of each one of these radial bores 442 that are defined in the radially extending web 441.

As schematically shown in FIGS. 3 and 4, a high pressure fluid conduit 313 is defined radially through the inner shaft 31. Desirably, there is a plurality of high pressure fluid conduits 313, and each high pressure fluid conduit 313 is equally spaced apart from each neighboring high pressure fluid conduit 313 in the circumferential direction. As schematically shown in FIG. 3, an inward distribution groove 314 is defined and extends circumferentially around the inwardly facing surface of the inner shaft 31 and is in flow communication with the inwardly facing open end of the high pressure fluid conduits 313. The outer end of each of the radial bores 442 defined in the radially extending web 441 of the cover 44 also is disposed in fluid communication with the inward distribution groove 314 defined in the inwardly facing surface 311 of the inner shaft 31. As schematically shown in FIG. 4, an outward distribution groove 315 is defined and extends circumferentially around the outer surface 311 of the inner shaft 31 and is in flow communication with the outwardly facing open end of each of the high pressure fluid conduits 313. The outward distribution groove 315 is disposed beneath the recess in which the annular ring 61 is pressfit into the outer surface 311 of the inner shaft 31.

As schematically shown in FIG. 4, the thickness of the central region 615 of the annular ring 61 is reduced relative to the thickness of the rest of the annular ring 61 measured from the outer surface 613 to the inner surface 614. Thus, the annular ring 61 defines tapered regions 616 from the outer surface 613 and tapered regions 617 from the inner surface 614. This central region 615 that is bordered forward and aft by the respective tapered regions 616, 617 extends circumferentially around the annular ring 61. Moreover, there is a plurality of holes 618 through this central region 615, and these holes 618 through the central region 615 desirably are spaced apart circumferentially around the annular ring 61 at regular intervals.

In operation, highly pressurized incompressible fluid is fed under pressure in any conventional manner into the aft end of the axial conduit 443 of the cover 44 and thence to the forward end of the axial conduit 443 where it reaches the inner end of each one of the radial bores 442, as schematically indicated by the largest heavy arrow in FIG. 3. As schematically indicated by the chain dashed line, the incompressible fluid then travels radially through the radial bores 442 to the outer ends of the radial bores 442 and into the inward distribution groove 314 defined in the inwardly facing surface 312 of the inner shaft 31. The highly pressurized incompressible fluid distributes circumferentially within the inward distribution groove 314 and then travels radially through each of the high pressure fluid conduits 313 and empties into the outward distribution groove 315 that is defined and extends circumferentially around the outwardly facing surface 311 of the inner shaft 31. The high pressure incompressible fluid then passes through the holes 618 in the central region 615 of the annular ring 61 and into the thin annular gap that is defined between the inner surface 524 of the inner race 52 and the outer surface 613 of the annular ring 61 as shown in FIG. 4 for example.

The flow of oil that enters the annular gap of the squeeze film damper 60 provides damping to the differential bearing 40 so as to mitigate dynamic issues that arise during operation of the differential bearing 40. The dimension of the annular gap at any point around the circumference of the squeeze film damper 60 depends upon the pressure of the incompressible fluid, the degree of compression of the resilient seals 62, 64 and the deflection of the inner race 52 in the radial direction toward the outer surface 613 of the annular ring 61 that might be caused by various dynamic issues that may arise during operation of the differential bearing 50.

Oil that lubricates and cools the differential bearing 50 is supplied under much lower pressure conditions than the incompressible fluid that is used to provide the thin film of the squeeze film damper 60. Thus, a separate supply network desirably is provided for supplying lubricating and cooling oil to the differential bearing 50. As schematically indicated by the two heavy arrows in FIG. 3, lubricating and cooling oil is supplied under pressure to each of the aft side and the forward side of the differential bearing 50.

As schematically shown in FIGS. 4 and 5 for example, defined through the inner race 52 is a plurality of oil supply conduits 523. Each oil supply conduit 523 extends between the raceway 521 and the inner surface 524 of the inner race 52. Desirably, a plurality of these oil supply conduits 523 will be spaced circumferentially apart around the circumference of the inner race 52 and at each of the opposite side edges of the raceway 521 of the inner race 52 as schematically shown in FIGS. 4 and 5 for example. One end of each of these oil supply conduits 523 is in fluid communication with the raceway 521. As schematically shown in FIG. 4, the opposite end of each of these oil supply conduits 523 is in fluid communication with a circumferentially extending groove 525 that is defined in the inner surface 524 of the inner race 52. These oil supply conduits 523 are sized to meter a controlled flow of oil for lubricating and cooling the differential bearing 50.

As schematically shown in FIG. 3, the aft side of the differential bearing 50 is supplied with lubricating and cooling oil via the first low pressure annular plenum that is formed between the outer surface 444 of the cover 44 and the inner surface 312 of the inner shaft 31 as schematically indicated in FIG. 3 by the chain dashed line 451. The forward side of the differential bearing is supplied by the second low pressure annular plenum, which is formed internally of the cover 44. As schematically shown in FIG. 3 by the parallel dashed lines, there are a plurality of axial passages 445 formed through the web 441 that contains the radial bores 442, and the lubricating and cooling oil flows from aft to forward in the radial direction through these passages 445. As schematically shown in FIG. 3, the lubricating and cooling oil then passes through each of the plurality of openings 446 that are defined through the outer wall of the cover 44 and thence into the circumferentially extending groove 316 formed in the inner surface 312 of the inner shaft 31. Then the lubricating and cooling oil passes through a plurality of radially extending channels 317 defined through the inner shaft 31. Upon exiting these channels 317, the oil takes a path toward the differential bearing 50, and this path is schematically represented by the dashed line designated 452 in FIG. 4. Additionally, as can be seen from FIGS. 3 and 5, the lubricating and cooling oil that exit these channels 317 can enter a circumferentially extending groove 527 defined through the inner surface 524 of the inner race 52 and then travel through a plurality of radially extending bores 526 that are defined through the forward end of the inner race 52.

As shown in FIG. 4, there is a plurality of holes 619, and each of these holes 619 is defined through the forward end of the annular ring 61. These holes 619 are spaced apart along the peripheral edge of the forward end of the annular ring 61. A similar plurality of holes 619 is defined through the aft end of the annular ring 61. The dashed lines 452 schematically represent the path taken by the flow of lubricating and cooling oil through these holes 619 and into the respective circumferentially extending grooves 525 defined in the inner surface 524 of the inner race 52.

The dashed lines 452 shown in FIG. 4 further schematically represent the continued path taken by the flow of lubricating and cooling oil through the oil supply conduits 523 that extend from the grooves 525 through the outer surface 521 of the inner race 52 to lubricate and cool the rollers 58 and the roller cage 56. As the pressure at which this oil is provided to lubricate and cool the differential bearing 50 can vary according to the particular differential bearing 50 and engine 10, the diameters of the oil supply conduits 523 through the inner race 52 will be sized accordingly in order to ensure the proper flow rate of the oil at the available oil pressure in order to supply adequate lubrication and cooling to the differential bearing 50.

Each of the above exemplary embodiments of the present disclosure adds damping to the system in a very compact and efficient manner by incorporating the squeeze film damper 60 directly into one of the counter-rotating shafts 31 that is supported by the differential bearing 50 itself. The squeeze film damper 60 provides a sealing function with a centering function for the differential bearing 50, and the grooves 62, 64 in the annular ring 61 of the squeeze film damper 60 can be machined with standard machining processes, thus rendering the system less expensive than other ways of improving the bearing's dynamic tolerance capacity. Each of these embodiments maximizes the bearing's dynamic tolerance capability to maximize the bearing's load capacity, reliability and useful life without compromising the effectiveness of the lubrication and cooling of the differential bearing. Thus, each embodiment lengthens the duration of time that the engine 10 can remain in active service.

This written description uses examples to disclose the invention, including the best mode, and also to enable any person skilled in the art to practice the invention, including making and using any devices or systems and performing any incorporated methods. Accordingly, the foregoing description of the preferred embodiment of the invention and the best mode for practicing the invention are provided for the purpose of illustration only and not for the purpose of limitation. While specific embodiments of the present invention have been described, it will be apparent to those skilled in the art that various modifications thereto can be made without departing from the spirit and scope of the invention. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims. For instance, features illustrated or described as part of one embodiment may be used on another embodiment to yield a still further embodiment.

What is claimed is:

1. A counter-rotating shaft assembly of a gas turbine engine, the assembly comprising:
    a cylindrical outer shaft rotatable in a first direction about a virtual rotational axis;
    a cylindrical inner shaft rotatable about the virtual rotational axis in a second direction that is opposite to the first direction, the inner shaft being disposed radially inwardly with respect to the outer shaft;
    a differential bearing that couples the inner shaft to the outer shaft, the differential bearing including an outer race attached to the outer shaft, the differential bearing including an inner race rotatable with respect to the outer race and attached to the inner shaft via a centering spring; and
    a squeeze film damper disposed between the inner race and the inner shaft and including an annular ring that is disposed between the inner shaft and the inner race of the differential bearing, the annular ring defined by a forward end and an aft end spaced axially apart from the forward end, and the squeeze film damper including a forward groove defined in the forward end of the annular ring and extending circumferentially with respect to the virtual central axis.

2. The assembly of claim 1, wherein the centering spring that attaches the inner race to the inner shaft includes a spring finger housing.

3. The assembly of claim 1, wherein the squeeze film damper includes an annular gap that extends between the inner shaft and the inner race of the differential bearing.

4. The assembly of claim 1, wherein the forward groove defines a radial depth that extends from the outer surface of the annular ring in a direction radially toward the virtual central axis and defines a forward groove diameter, and the squeeze film damper further includes a forward resilient seal disposed within the forward groove, the forward resilient seal defining an inner diameter and an outer diameter that is larger than the inner diameter such that the difference between the inner diameter and the outer diameter defines the uncompressed thickness of the forward resilient seal, and the forward groove diameter is smaller than the inner diameter of the forward resilient seal.

5. The assembly of claim 1, wherein the inner shaft defines an outer surface having an annular recess disposed in alignment with the inner race of the differential bearing.

6. The assembly of claim 5, wherein the squeeze film damper includes an annular ring that is disposed in the annular recess of the outer surface of the inner shaft.

7. The assembly of claim 6, wherein the annular ring defines an outer surface, the inner race of the differential bearing defines an inner surface, and the squeeze film damper includes an annular gap that extends between the outer surface of the annular ring and the inner surface of the inner race of the differential bearing.

8. The assembly of claim 6, wherein the annular ring defines a cylindrical outer surface, the inner race of the differential bearing defines an inner surface, and the squeeze film damper includes an annular gap that extends between the cylindrical outer surface of the annular ring and the inner surface of the inner race, and wherein the dimension of the annular gap at any point around the circumference of the squeeze film damper depends at least in part upon the degree of compression of a forward resilient seal.

9. The assembly of claim 6, wherein the inner shaft defines at least one high pressure fluid conduit that is in fluid communication with the annular ring.

10. The assembly of claim 9, wherein the annular ring defines at least one oil supply hole that is in fluid communication with the annular gap and the at least one high pressure fluid conduit.

11. The assembly of claim 1, wherein the squeeze film damper includes an aft groove defined in the aft end of the annular ring and extending circumferentially with respect to the virtual central axis, the aft groove defines a radial depth that extends from the outer surface of the annular ring in a direction radially toward the virtual central axis, and the squeeze film damper further includes an aft resilient seal disposed within the aft groove, the aft resilient seal defining an inner diameter and an outer diameter that is larger than the inner diameter such that the difference between the inner diameter and the outer diameter of the aft resilient seal defines the uncompressed thickness of the aft resilient seal, and the uncompressed thickness of the aft resilient seal is less than the radial depth of the aft groove.

12. The assembly of claim 1, wherein the inner race defines a raceway and a plurality of rollers are disposed on the raceway and rotatable with respect to the raceway, the inner race further defines a plurality of oil supply bores, each oil supply bore extending between the inner surface of the inner race and the raceway.

13. The assembly of claim 12, wherein the squeeze film damper includes an annular ring that is disposed between the inner shaft and the inner race of the differential bearing, wherein the annular ring defines a plurality of oil supply holes that are disposed in fluid communication with the plurality of oil supply bores defined in the inner race.

14. The assembly of claim 13, wherein the inner shaft defines a plurality of oil supply bores that are disposed in fluid communication with the plurality of oil supply holes defined in the annular ring.

15. A gas turbine engine comprising:
a fan assembly including a plurality of blades extending radially from a hub and rotatable about a virtual rotational axis defined centrally through the hub;
a first compressor disposed downstream from the fan assembly;
a first turbine disposed downstream of the compressor and coupled to the first compressor via an inner shaft;
a second compressor disposed downstream from the fan assembly;
a second turbine disposed downstream of the second compressor and coupled to the second compressor via an outer shaft; and
a counter-rotating shaft assembly that includes:
a differential bearing that couples the inner shaft to the outer shaft, the differential bearing including an inner race attached to the inner shaft and an outer race rotatable with respect to the inner race and attached to the outer shaft, wherein the outer shaft is rotatable about the virtual rotational axis in a first direction and the inner shaft is rotatable about the virtual rotational axis in a second direction that is opposite to the first direction, the inner shaft being disposed radially inwardly with respect to the outer shaft; and
a squeeze film damper disposed between the inner race and the inner shaft;
wherein the inner race defines a raceway and a plurality of rollers are disposed on the raceway and rotatable with respect to the raceway, and wherein the inner race further defines a plurality of oil supply bores, each oil supply bore extending between the inner surface of the inner race and the raceway.

16. The gas turbine engine assembly of claim 15, wherein the inner race is attached to the inner shaft via a spring finger housing.

17. The gas turbine engine assembly of claim 15, wherein the squeeze film damper includes an annular ring that is disposed between the inner shaft and the inner race of the differential bearing.

18. The gas turbine engine assembly of claim 17, wherein the annular ring is defined by a forward end and an aft end that is spaced axially apart from the forward end, and the squeeze film damper includes a forward groove defined in the forward end of the annular ring and extending circumferentially with respect to the virtual central axis.

19. A counter-rotating shaft assembly of a gas turbine engine, the assembly comprising:
a cylindrical outer shaft rotatable in a first direction about a virtual rotational axis;
a cylindrical inner shaft rotatable about the virtual rotational axis in a second direction that is opposite to the first direction, the inner shaft being disposed radially inwardly with respect to the outer shaft, and the inner shaft defining an outer surface having an annular recess;
a differential bearing that couples the inner shaft to the outer shaft, the differential bearing including an outer race attached to the outer shaft, the differential bearing including an inner race rotatable with respect to the outer race and attached to the inner shaft via a centering spring, the outer surface of the inner shaft disposed in alignment with the inner race of the differential bearing and the squeeze film damper including an annular ring that is disposed in the annular recess of the outer surface of the inner shaft; and
a squeeze film damper disposed between the inner race and the inner shaft;
wherein the annular ring defines an outer surface, wherein the inner race defines an inner surface, and wherein the squeeze film damper includes an annular gap that extends between the outer surface of the annular ring and the inner surface of the inner race.

20. The assembly of claim 19, wherein the inner shaft defines at least one high pressure fluid conduit that is in fluid communication with the annular ring, and wherein the annular ring defines at least one oil supply hole that is in fluid communication with the annular gap and the at least one high pressure fluid conduit.

* * * * *